July 2, 1957 B. V. FRIEDRICH 2,797,522
FISH LURE
Filed May 12, 1954
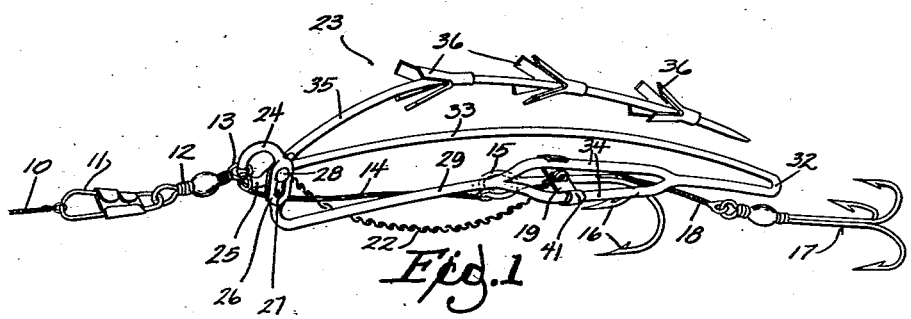
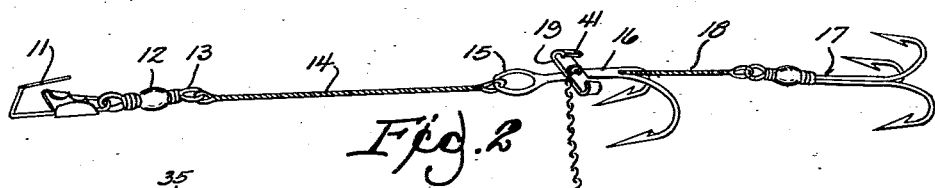
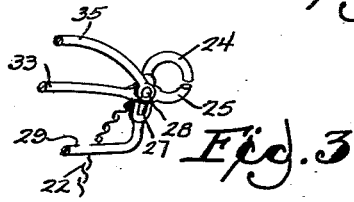
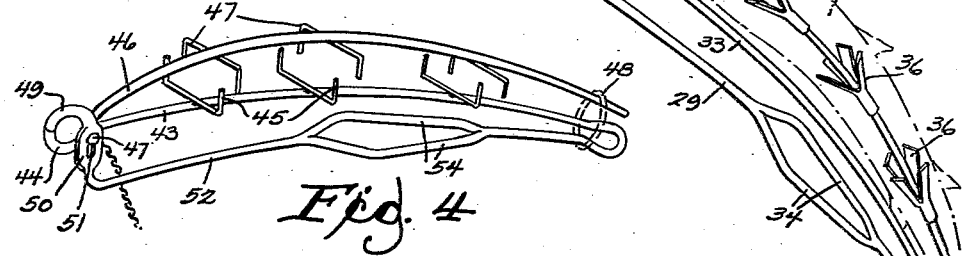
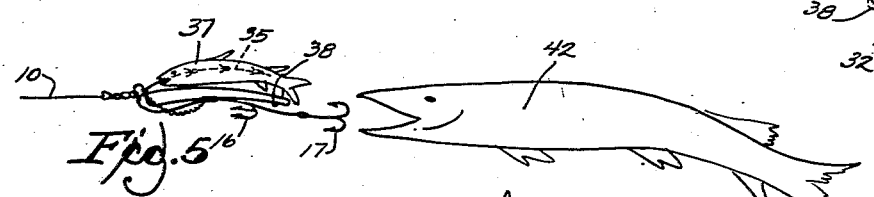
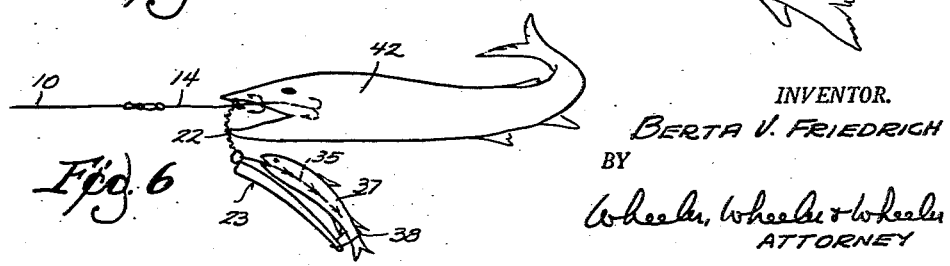
INVENTOR.
BERTA V. FRIEDRICH
BY
Wheeler, Wheeler & Wheeler
ATTORNEY

United States Patent Office 2,797,522
Patented July 2, 1957

2,797,522

FISH LURE

Berta V. Friedrich, Milwaukee, Wis.

Application May 12, 1954, Serial No. 429,287

5 Claims. (Cl. 43—44.8)

This invention relates to a fish lure.

The object of the invention is to provide a fish lure in which the bait holder and hooks are separable under pressure of the fish bite whereby the fish may expel the bait and bait holder to reduce the bulk of the lure in the fish's mouth, and thus facilitate setting the hook. The invention is particularly applicable to lures for large game fish, such as pickerel or northern pike, for which the bait usually comprises a small fish.

According to the present invention, the bait holding frame is provided with jaws releasably engaged with the leader, the pressure of the fish bite opening said jaws against their resilient bias to permit the game fish to cough or otherwise expel the bait holder from its mouth.

In the drawings:

Fig. 1 is a perspective view of a fish lure embodying my invention.

Fig. 2 is a perspective view of the device of Fig. 1 after the bait holder has been released from the leader.

Fig. 3 is a detail view in perspective of the forward portion of the bait holder and showing the construction of the releasable jaws.

Fig. 4 is a perspective view of a modified embodiment of bait holder usable in my fish lure.

Fig. 5 is a diagrammatic view showing my fish lure just prior to a strike by a game fish.

Fig. 6 is a diagrammatic view of my fish lure after the game fish has taken the hook and expelled the bait holder and bait from his mouth.

The line 10 may be provided with the usual leader clasp 11 having a swivel coupling 12 with a ring or eye 13. As best shown in Fig. 2, leader line 14 connects ring 13 to the eye 15 of a double pronged hook 16 from which a triple pronged hook 17 may trail at the end of line 18. Double pronged hook 16 is provided with a clasp 19 to which my bait holder, indicated generally by reference character 23, is connected by means of chain 22.

Bait holder 23 comprises upper and lower jaws 24, 25 normally resiliently closed about the eye 13, as shown in Fig. 1, but releasable therefrom as shown in Fig. 2. Jaw 24 has a flattened shank 26 with a slot 27 elongated in the direction of jaw opening movement to slidably receive guide pin 28 connected to lower jaw 25.

The shank 26 of jaw 25 is provided with a rearwardly extending arm 29 which is desirably looped at 32 to return at 33 to compromise an arm for lower jaw 25. Intermediate its length arm 29 is split into bifurcated legs 34 which rearwardly converge over the greater portion of their length to comprise anchorage means to which the clasp 19 of hook 16 is connected as hereinafter explained.

Arms 29, 33 of the jaws 24, 25 are fabricated of resilient material, such as spring wire, and are preset to bias jaw 24 toward jaw 25 to securely engage the jaw about ring 13 as shown in Fig. 1.

Pivoted to pin 28 on jaw 25 is bait impaling arm 35 which is provided with longitudinally spaced sets of circumferentially disposed forwardly directed prongs 36 which engage the flesh of the bait fish 37 in the manner shown in Figs. 2, 5 and 6.

When not in use, impaling arm 35 is free to pivot on pin 28. However, when the bait fish 37 is impaled thereon and the lure made ready for fishing, a rubber band 38, or the like, may be used to hold the arm 35 and bait fish 37 to the looped ends of arms 29 and 33 of the bait holding frame.

Clasp 19 on double pronged hook 16 is provided with incurved ends 41 which may be frictionally engaged with the rearwardly converging legs 34 on arm 29 by sliding them forwardly to the position shown in Fig. 1. Lines 14 and 22 have sufficient slack to permit this manipulation.

When the game fish 42 takes the lure in its mouth and closes its jaws on the bait fish and bait frame, the pressure of the game fish's jaws will open the bait frame jaws 24, 25 against the resilient closing bias of spring arms 29, 33 to release the jaws from the ring 13 of swivel 12. Arms 29 and 33 function in the manner of a trigger actuated by the game fish to open jaws 24, 25. Meanwhile, the hooks 16 and 17 impale the game fish. The game fish will normally react by attempting to spit or cough out the lure, thus expelling the bait fish 37 and bait frame 23 to its position shown in Fig. 6. In this action the bait frame legs 34 slide forwardly in clasp 19 to release from direct engagement with the hook 16. The frame and bait fish are retained against loss, however, by the chain 22. The game fish may now completely close its mouth to firmly set the hook.

In Fig. 4 I show a modified bait frame in which the arm 43 connected to lower jaw 44 is provided with a longitudinally spaced series of upwardly pronged U-shaped skeleton cage members 45. The arm 46 pivoted on pin 47 is provided with a complementary longitudinally spaced series of downwardly pronged U-shaped skeleton members 47. The bait fish may be embraced by the skeleton cage members 45, 47 and held by the rubber band 48, or the like, to the bait frame proper. In all other respects, the embodiment of Fig. 4 is like that of Fig. 1 and its operation is the same. The opposed jaw 49 is provided with a flattened shank 50 with a slot 51 elongated in the direction of jaw opening movement and a rearwardly extending arm 52 having rearwardly converging legs 54 to which the clasp 19 on hook 16 may be engaged. Slot 51 slidably guides the pin 47 on arm 43 of jaw 44. In both embodiments of the invention I prefer the slotted jaw shank over a simple pivot between the jaws, in order to attain wide separation of the jaws for instant release of the bait holder from ring 13 when the game fish strikes.

I claim:

1. A fish lure comprising an attachment for a line and having an eye, a bait holder having releasable jaws engaged through said eye, resilient means for holding said jaws closed through said eye, the bias of said resilient means adapted to be overcome by the pressure of a fish bite on said lure to release said jaws from said eye, and a hook connected to said attachment independently of the connection of said jaws to said eye whereby to hook the fish and remain hooked after the bait holder is released from the eye, said resilient means comprising arms connected respectively to said jaws, and means connecting said jaws and arms for relative movement of the jaws between open and closed positions on said eye.

2. The device of claim 1 in which the means connecting said jaws and arms comprises a shank on one of said jaws, said shank having a slot aligned in the direction of jaw opening movement, the other said jaw having a pin slidably engaged in said slot.

3. The device of claim 2 in which said arms consist of a resilient wire having an intermediate loop comprising said resilient means.

4. A fish lure attachment for a fish line having an eye, said lure comprising a bait holder, a fish hook, releasable means for holding said bait holder and fish hook in assembly, trigger means responsive to the fish taking the lure in its mouth and biting thereon to trigger said releasable means and thereby condition said bait holder and hook for disassembly and ejection by the fish of the bait holder from its mouth, said bait holder comprising a bait frame, said releasable means comprising jaws normally closed upon said eye, and said trigger means comprising arms connected to said jaws to open said jaws when the arms are actuated by the pressure of a fish bite.

5. The device of claim 4 in which said releasable means further comprises a hook anchorage including rearwardly convergent leg portions on one of said jaw arms, said hook being provided with a clasp having laterally spaced means for embracing said leg portions, and means connecting said hook to said fish line, said clasp being releasable from said legs upon ejection by the fish of said bait holder.

References Cited in the file of this patent

UNITED STATES PATENTS

| | | |
|---|---|---|
| 1,318,073 | Gottschalk | Oct. 7, 1919 |
| 1,682,711 | Pflueger | Aug. 28, 1928 |
| 2,476,485 | Erickson et al. | July 19, 1949 |
| 2,533,390 | Miller | Dec. 12, 1950 |
| 2,547,103 | White | Apr. 3, 1951 |

FOREIGN PATENTS

| | | |
|---|---|---|
| 622,793 | Great Britain | May 6, 1949 |